J. E. PRUYN.
BALL BEARING.
APPLICATION FILED SEPT. 19, 1916.

1,281,245.

Patented Oct. 8, 1918.

Inventor
John Ernest Pruyn
By his Attorneys
Rosenbaum, Stockbridge & Rome

UNITED STATES PATENT OFFICE.

JOHN ERNEST PRUYN, OF PHILADELPHIA, PENNSYLVANIA, ASSIGNOR OF ONE-HALF TO EMILY C. PRUYN, OF PHILADELPHIA, PENNSYLVANIA.

BALL-BEARING.

1,281,245.                 Specification of Letters Patent.      Patented Oct. 8, 1918.

Application filed September 19, 1916.   Serial No. 120,992.

*To all whom it may concern:*

Be it known that I, JOHN ERNEST PRUYN, a citizen of the United States, residing at Philadelphia, in the county of Philadelphia and State of Pennsylvania, have invented certain new and useful Improvements in Ball-Bearings, of which the following is a full, clear, and exact description.

My invention relates to anti-friction bearings for machinery, particularly to ball or roller bearings, and especially to bearings adapted to both radial and end-thrust loads.

The object of the invention is to produce a combined radial and end-thrust bearing that occupies a small space, that takes up a minimum of the length of the shaft, is made of few parts, is easily assembled, that cannot be disassembled without removing the shaft, that is self-adjusting both as to the direction of the shaft and as to the direction of load, and yet the axes of rotation of the radial anti-friction balls or rolls are absolutely parallel to the axis of the shaft, and the axes of rotation of the end-thrust balls are absolutely perpendicular to the axis of the shaft under all conditions; a bearing that can be manufactured with a minimum of machining of parts.

The invention consists in certain features of construction and combinations and arrangements of parts, all of which will be fully set forth herein and particularly pointed out in the claims.

Figure 1:
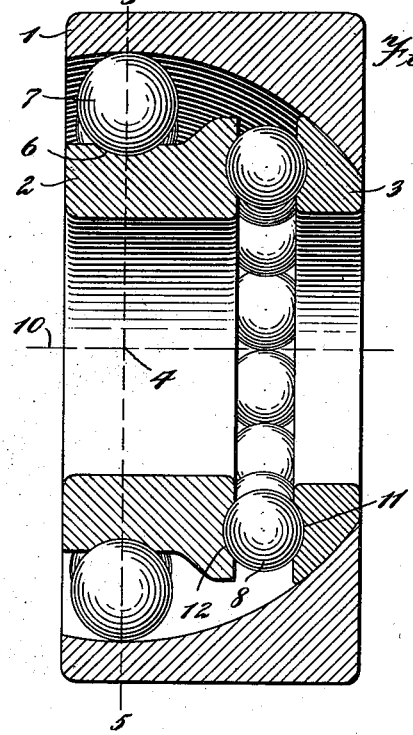
Figure 1 is an axial section of a bearing made in accordance with my invention.

In each of the figures of the drawing, 1 is an outer ring adapted to be suitably secured in the frame of the machine in which the bearing is used, 2 is an inner ring in which a shaft is adapted to be secured, and 3 an end-thrust ring mounted in the ring 1.

Figure 4:
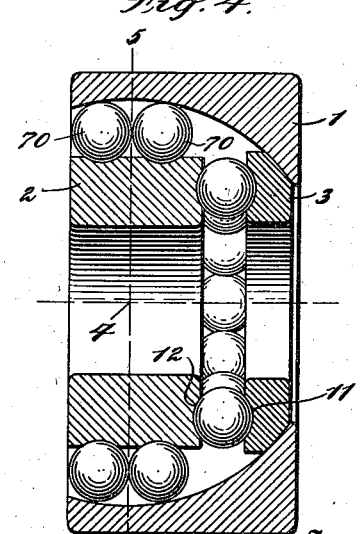
Fig. 4 is a similar section showing another modification.

In the forms of the invention shown in Figs. 1 and 4, the bearing consists solely in the three rings 1, 2, and 3, and the anti-friction balls. The ring 1 has its inner surface in the form of a zone of a sphere whose center 4 is within the bearing, and so situated that the equator 5, 5 of said zone is at a short distance from one end of the bearing and at a greater distance from the other end of the bearing. In Fig. 1 the ring 2 has a peripheral raceway 6 in which run the anti-friction members or balls 7 which takes the radial pressure of the shaft. These balls also bear on the spherical inner surface of the ring 1, and, when the parts are positioned as shown in Fig. 1, they have their centers substantially in the equator 5, 5.

The ring 3 occupies the end of the ring 1 farthest removed from the center 4, and which, therefore, is more contracted than the other end of said ring 1. Said ring 3 has a convex spherical surface whose center coincides with the center 4, and it has a raceway or groove 11 in its inner face, and a similar raceway 12 is formed in the end of the ring 2, and anti-friction members or balls 8 running in these raceways take the end-thrust of the shaft.

Figure 2:
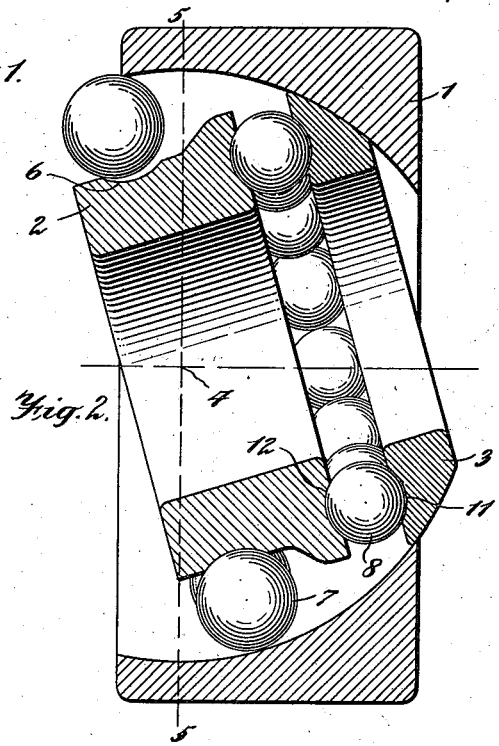
Fig. 2 is a similar view of the same, but showing the parts in process of assembling.

In assembling the bearing, the ring 3 is first put in place, the balls 8 are placed on said ring, and the ring 2 is placed on said balls, after which the balls 7 are inserted. This can be done by merely displacing the ring 2 to one side, so as to bring one point of the circle occupied by said balls outside of the ring 1, and inserting the balls at the top, all as shown in Fig. 2. After the last ball 7 has been put in place on the ring 2, the parts are tilted back to the position shown in Fig. 1. When in this position, or in any position approximating to it, the bearing cannot be disassembled, because both ends of the ring 1 are contracted, the right hand end considerably and the left hand end to a less extent but sufficiently to prevent the balls and other parts from escaping from their proper locations. The bearing cannot be disassembled or come apart when the shaft is in the ring 2 and the bearing is in place in the machine, though it can be readily disassembled when the shaft is removed, by reversing the process above described. It will be noted that the bearing can be assembled and disassembled without any distortion or forcing of the parts and that no special passages or cut-outs are required for inserting or removing the balls. The working of the balls 7 into place can be facilitated by giving a rotary motion to the ring 2, but this only rolls the balls into place and does not involve any forcing action.

It will also be noted that in use the bearing adjusts itself automatically to the direction of the shaft, so that, in constructing the machine in which said bearing is used, it is not necessary to have the axis of said shaft and the axis of the ring 1 exactly coincident. In fact the two axes can stand at an agle to each other much greater than would be produced by ordinary inaccuracy of workmanship without making any difference whatever in the operation of the bearing. One end of said shaft can be oscillated as is necessary, for example, in certain friction drives, and the bearing will adjust itself to such oscillations perfectly. If the end of the shaft be moved, the rings 2 and 3 will move correspondingly, about the center 4, and the radial bearing balls 7 will follow the ring 2, and in any position of said ring said balls 7 will be in a great circle of the sphere in whose surface the inner surface of the ring 1 is formed. In such a machine as an automobile, for example, the bearing will adjust itself perfectly to any bending of the frame.

Under all conditions, the balls 7 roll on axes parallel to the axis 10 of the shaft, and the action of said balls is, therefore, always a pure rolling action, with no spinning; and the pressure on said balls is always perpendicular to the axis of the shaft.

Under all conditions also the balls 8 roll on axes perpendicular to the axis 10 of the shaft, and their motion also is a pure rolling motion and the pressure on them is always in a direction parallel to the axis of the shaft.

It will be noted that the bearing is very compact and takes up but little of the length of the shaft. It will also be observed that there is nothing about the bearing that is liable to be cramped or otherwise wrongly adjusted by reason of lack of skill on the part of the user or the person who puts the bearing into the machine.

The bearing has few parts, which makes it inexpensive to manufacture and reduces to a minimum the effects of inaccuracy of construction.

Figure 3:
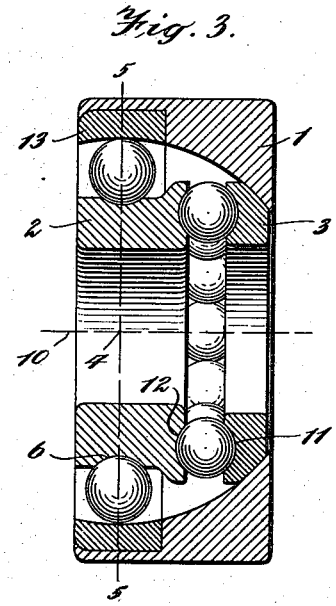
Fig. 3 is an axial section of another form of the invention.

In case it is not desired to make the entire ring 1 of a grade and temper of steel suitable to act as a ball-bearing member, a ring 13 of hard steel can be seated in an annular recess in said ring 1, and secured in place, as by swaging the ring 1 over the rounded edge of said ring 13, all as shown in Fig. 3.

In Fig. 4 I have shown the radial bearing as comprising two rows of balls 70, the ring 2 having two raceways in its periphery. In this construction the two rows of balls 70 are preferably disposed one on each side of the equator 5, 5 and as near as may be to said equator. In this form of the invention the balls 70 almost, but not quite, roll on axes parallel to the axis 10 of the shaft.

The entire inner surface of the ring 1 has been shown as formed upon the zone of a sphere, but this is not essential. A portion of this surface intermediate the ends of said ring is never engaged by either the ring 3 or the balls 7 after the parts of the bearing have been assembled, and such portion may therefore be of any shape desired. When, therefore, I refer in the claims to the outer ring as having a spherical inner surface, it is to be understood that this expression comprehends a construction in which said ring is provided with two spherical portions adjacent the balls 7 and ring 3 which spherical portions are generated from a common center 4.

As full sets of balls have been shown in all the forms of my invention herein described, ball separators are not required therein, but it is obvious that a smaller number of balls may be employed, in which case separators therefor may be used, in accordance with established practice.

Various changes other than those above described, can be made in the details of construction and arrangement without departing from my invention.

I claim:

1. In a combined radial and end thrust bearing, an inner bearing ring, anti-friction radial bearing members surrounding the same and engaging the periphery thereof, an end thrust bearing ring, an outer ring surrounding the inner and end thrust rings and having a spherical inner surface, anti-friction bearing members between the end thrust ring and one of the other rings having their axes of rotation substantially perpendicular to the axes of rotation of the radial bearing members, both the radial and the end thrust bearing parts within the outer ring engaging the spherical surface of said outer ring and being self-adjusting about the center of said surface.

2. In a bearing of the class described, the combination of an outer bearing ring having a spherical inner surface and having the passage therethrough more contracted at one end than at the other, an end-thrust bearing ring and an inner bearing ring both within the outer ring, anti-friction radial bearing members between the inner ring and the spherical surface of the outer ring, and anti-friction bearing members located between the end-thrust bearing ring and one of the other rings and having their axes of rotation substantially perpendicular to the axes of rotation of the radial bearing members.

3. In a bearing of the class described, the combination of an outer bearing ring having the passage therethrough more contracted at one end than at the other, an inner bearing ring and an end-thrust bearing ring, one of said rings being provided with a spherical inner surface and another of said rings being provided with a spherical outer surface of the same curvature engaging the spherical inner surface of the first ring, anti-friction bearing members between the end-thrust bearing ring and one of the other rings adjacent the contracted end of said outer ring, and anti-friction radial bearing members between the inner and outer rings, the latter bearing members engaging a spherical surface on the inner wall of the outer ring.

4. In a bearing of the class described, the combination of an outer bearing ring having the passage therethrough more contracted at one end than at the other and an inner bearing ring, one of said rings having a spherical surface thereon, an end-thrust bearing ring having a spherical surface thereon corresponding in curvature with, and engaging, the spherical surface on the other ring, anti-friction end-thrust bearing members between two of said rings, and anti-friction radial bearing members between the inner ring and the outer ring, the latter bearing members engaging a spherical surface on the inner wall of the outer ring.

5. In a bearing of the class described, the combination of an outer ring having a spherical inner surface, an end-thrust bearing ring seated in the contracted portion of said outer ring, an inner bearing ring, anti-friction bearing members between said end-thrust bearing ring and the end of said inner ring, and anti-friction radial bearing members between said inner ring and the spherical surface of said outer ring.

6. In a bearing of the class described, the combination of an outer ring having a spherical inner surface, an end-thrust bearing ring seated in the contracted portion of said outer ring, an inner bearing ring, anti-friction bearing members between said end-thrust bearing ring and the end of said inner ring, and anti-friction radial bearing members between said inner ring and the spherical surface of said outer ring, said radial bearing members being so disposed that the pressure thereon is substantially perpendicular to the axis of said inner ring.

7. In a bearing of the class described, the combination of an outer ring having its internal surface in a zone of a sphere, said zone extending slightly beyond the equator in one direction and to a greater distance beyond the equator in the opposite direction, whereby the opening in said ring is slightly contracted at one end and more contracted at the other end, an end-thrust bearing ring seated in the more contracted end of said opening, an inner bearing ring, anti-friction members between said end-thrust ring and the end of said inner ring, and anti-friction members between said inner and outer rings, the last recited members being substantially in the equator of said spherical surface.

8. In a bearing of the class described, the combination of an outer bearing ring having its internal surface in a zone of a sphere, an inner bearing ring, anti-friction members between the two said rings, an end-thrust bearing ring seated in the spherical surface of said outer ring, and anti-friction members between said end-thrust bearing ring and the end of said inner ring, said outer ring extending beyond the equator of said zone in both directions so that the bearing can be assembled by a tilting action but cannot be disassembled when the parts are in position for use.

9. In a bearing of the class described, the combination of an outer ring having an inner spherical surface, and radial and end-thrust bearing members substantially perpendicular to each other self-adjusting about the center of said spherical surface.

10. In a bearing of the class described, the combination of an outer ring having an inner spherical surface whose center is within said bearing whereby both ends of said surface are more or less contracted, and radial and end-thrust bearing members substantially perpendicular to each other in said ring and self-adjusting about the center of said spherical surface.

11. In a bearing of the class described, the combination of an outer ring having its internal surface in a zone of a sphere, said zone extending beyond the equator in both directions, an inner ring, anti-friction members between said rings substantially in said equator, an end-thrust bearing ring seated in said internal spherical surface of the outer ring, and anti-friction members between said end-thrust ring and the end of said inner ring.

In witness whereof, I subscribe my signature, in the presence of two witnesses.

JOHN ERNEST PRUYN.

Witnesses:
WM. M. STOCKBRIDGE,
WALDO M. CHAPIN.